(12) United States Patent
Brown et al.

(10) Patent No.: US 9,256,478 B2
(45) Date of Patent: Feb. 9, 2016

(54) SYSTEM FOR SCALABLE CONFIGURATION AND CONTEXT

(75) Inventors: Justin Brown, Seattle, WA (US); John Taylor, Bellevue, WA (US); Grzegorz Gogolowicz, Redmond, WA (US); Kenneth Wolf, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 157 days.

(21) Appl. No.: 13/233,042

(22) Filed: Sep. 15, 2011

(65) Prior Publication Data

US 2013/0074074 A1 Mar. 21, 2013

(51) Int. Cl.
*G06F 9/44* (2006.01)
*G06F 9/54* (2006.01)
*G06F 9/445* (2006.01)

(52) U.S. Cl.
CPC .............. *G06F 9/54* (2013.01); *G06F 9/44505* (2013.01)

(58) Field of Classification Search
CPC ........ G06F 11/34; G06F 9/4856; G06F 11/30
USPC .......................................................... 717/121
See application file for complete search history.

(56) References Cited

U.S. PATENT DOCUMENTS

| 6,014,669 | A | * | 1/2000 | Slaughter et al. ............. 707/610 |
| 7,519,600 | B1 | * | 4/2009 | Zenz ..................................... 1/1 |
| 7,552,420 | B1 | | 6/2009 | Smith et al. |
| 2005/0091346 | A1 | * | 4/2005 | Krishnaswami et al. ..... 709/220 |
| 2005/0149545 | A1 | * | 7/2005 | Zenz ............................. 707/101 |
| 2010/0138737 | A1 | | 6/2010 | Olawsky et al. |
| 2011/0179303 | A1 | * | 7/2011 | Taylor et al. ................. 714/4.11 |

OTHER PUBLICATIONS

Basney, "An OGSI CredentialManager Service", Jul. 9, 2004, p. 1-5.*
Troger, "Dynamic Provisioning and Monitoring of Stateful Services", Jan. 16, 2007, p. 1-5.*
Wagner, et al., "An Architecture for Distributed Spatial Configuration of Context Aware Applications", Retrieved at <<http://citeseerx.ist.psu.edu/viewdoc/download?doi=10.1.1.103.1412&rep=rep1&type=pdf>>, 2nd International Conference on Mobile and Ubiquitous Multimedia, 2003, pp. 19-25.
Doring, et al., "Distributing Service Configuration Data Using Resource-Sharing Technologies", Retrieved at <<http://eris.prakinf.tu-ilmenau.de/pub/papers/doering03distributing.pdf>>, 2008, pp. 15.

(Continued)

*Primary Examiner* — Duy Khuong Nguyen
(74) *Attorney, Agent, or Firm* — Brian Haslam; Kate Drakos; Micky Minhas

(57) ABSTRACT

Instance properties are defined for instances of an application. During episodes of the instances, the values of the instance properties are populated. Other instances read the values of the instance properties without requiring the instance to run. If the value of an instance property is not populated, then a new episode of the instance is executed to populate the missing values. Instance properties may be grouped into property bags. An instance may populate the values of instance properties in a property bag atomically during one episode using a multi-set message. Other instances may read the values of the property bag instance properties using a multi-get request.

15 Claims, 3 Drawing Sheets

(56) References Cited

OTHER PUBLICATIONS

"Knowledge Management Configuration", Retrieved at <<http://help.sap.com/saphelp_nw73/helpdata/en/69/d96b7aa84611d5993600508b6b8b11/content.htm>>, Retrieved Date: Jul. 18, 2011, pp. 4.

"TemplateResponse and SimpleTemplateResponse", Retrieved at <<https://docs.djangoproject.com/en/dev/ref/template-response/#templateresponse-and-simpletemplateresponse>>, Retrieved Date: Jul. 18, 2011, pp. 5.

"Managing Application Configuration Data", Retrieved at <<https://mylab.ipcommerce.com/Docs/1.17.14/CWS_REST_Developer_Guide/RESTImplementation/PreparingTheAppToTransact/ManagingAppConfigData/index.aspx>>, Retrieved Date: Jul. 18, 2011, p. 1.

* cited by examiner

SYSTEM FOR SCALABLE CONFIGURATION AND CONTEXT

BACKGROUND

Programs often need some configuration and context data for their execution. It is typically a role of the system managing the programs to make configuration and context data available. Traditionally, this has been done using configuration ("config") files or by maintaining configuration and context data in databases.

However, the existing approaches are impractical in distributed systems that must scale to manage a potentially very large number, such as many millions, of program definitions and an even higher number of executing instances of these program definitions. Additionally, the distributed systems must provide shared and separate dynamic configuration and context data for program definitions and for executing program instances.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide a scalable configuration and context system that can meet the requirements of complex distributed systems. The use of instance properties as described herein allow distributed systems to scale to manage large number of program definitions and executing instances of the program definitions. The use of instance properties supports shared and separate configuration and context data for program definitions, executing instances, and scopes of program definitions. The instance properties support expiring and refreshing the data and allow for updating configuration and context data in a consistent way from within the distributed system and from outside. The instance properties operate without interrupting the execution of unaffected instances and with minimal interruption to the affected instances.

Instance properties may represent configuration and context data. The scalable configuration and context system is implemented in a novel way without using or requiring any configuration files and without directly using a database. Instead, the configuration and context data is represented as data or states of instances that are executed in episodic manner under the management of a hosting infrastructure. Retrieval and updates to the configuration and context data may be performed via messages.

Embodiments provide a mechanism for consistent retrieval and consistent updates of an arbitrary set of configuration data using instance properties to represent configuration and context data. Data owned by an instance may be retrieved without starting up the owning instance and without executing any logic of that instance. The system manages the lifetime of the configuration and context data by setting an expiry for the instance property values. Automatic resolution of different levels of context, including the instance level, in a continuation-based runtime is also provided.

DRAWINGS

DETAILED DESCRIPTION

Figure 1:
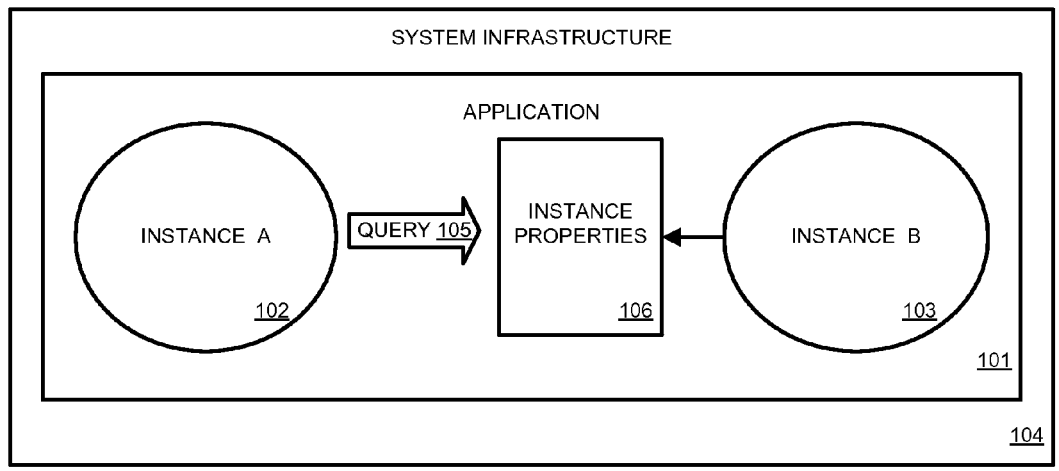
FIG. 1 illustrates an implementation of a scalable configuration and context system according to one embodiment.

FIG. 1 illustrates an implementation of a scalable configuration and context system according to one embodiment. Application 101 comprises a set of instances, including instance 102 and instance 103, representing individual units of the application. Application 101 is divided into instances, which have the capability of talking to each other. One instance may need to read values associated with another instance during operation. Application 101 runs on a system infrastructure 104, which manages the instances that make up the application. Application 101 may comprise any number of additional instances, which are not shown to simplify FIG. 1. The instances comprising application 101 must talk to each other to exchange information while running. For example, instance 102 may send a query 105 to instance 103 requesting certain values. In prior systems, Instance 103 would need to run to populate those values and to reply to the query. In embodiments of the invention, the instances may publish values to the system as a set of instance properties 106.

Instance 103 publishes a selected set of values to the system 104, which stores the values as instance properties 106. Accordingly, when instance 102 queries certain values of instance 103, the system does not need to load and execute instance 103 in order to determine those values. Instead, the system 104 can respond to instance 102 with the last set of values stored in instance properties 106 for instance 103 whether or not instance 103 is currently running.

Figure 2:
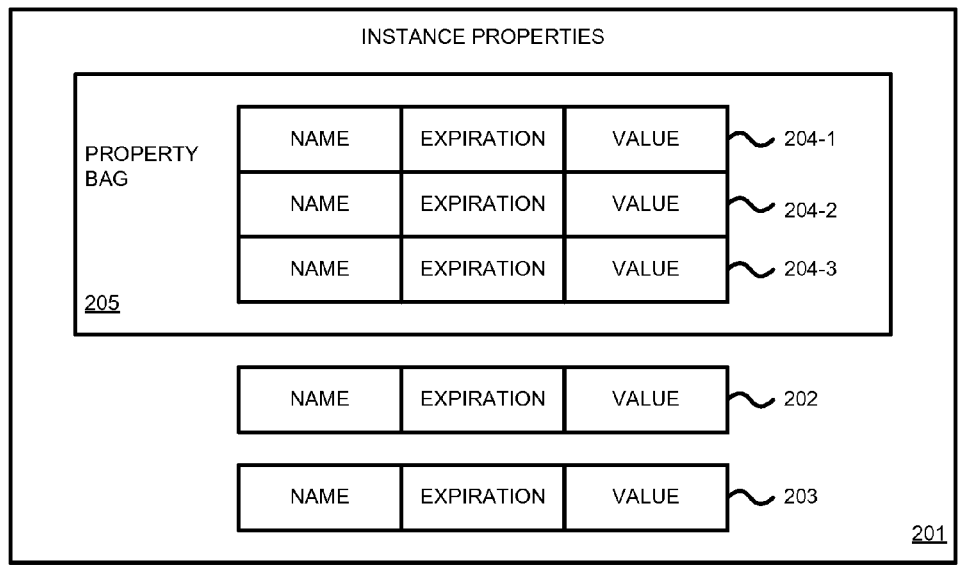
FIG. 2 illustrates an example of how instance properties may be organized according to one embodiment.

FIG. 2 illustrates an example of how instance properties may be organized according to one embodiment. Instance properties 201 may correspond to properties for a single instance or may represent coalesced values of two or more instances. Instance properties 201 may be stored in a physical table or may be a logical construct. Instance properties 201 may comprise a number of individual properties 202, 203, 204-$n$. Each instance property 202, 203, 204-$n$ has a name, an expiration, and a value. Another instance may read a particular instance value by using the instance property name to identify the desired value. Alternatively, a group of individual instance properties 204-$n$ may be combined into a property bag 205.

There may be a predefined list of instance properties for the instance to publish. Alternatively, the scope of the properties reported may be adjusted or defined by message. The application, the system infrastructure, or an external system, for example, may send a message to the instance defining what instance properties should be published.

The publishing instance has the capability to publish instance properties, update or overwrite published instance properties, or to delete instance properties. The publishing instance may also create a property bag comprising one or more instance properties. The publishing instance may also delete an existing property bag. The instance may perform one or more of these actions in one episode atomically, which allows for the operation of the multi-set and multi-get operations described below.

In the multi-set operation, an instance may update its instance properties as a group instead of individually. All updates for an episode or checkpoint occur atomically.

In the multi-get operation, one instance may read multiple properties from another instance. The read for a multi-get operation succeeds only when all values in the requested set are valid. If all values in the requested set are not valid, then the multi-get operation will wait until all values are valid before reading the values.

Figure 3:
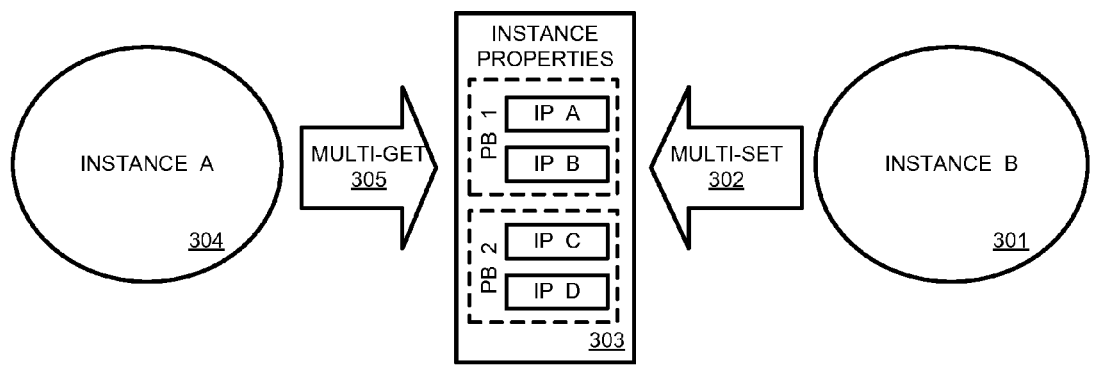
FIG. 3 illustrates the multi-set and multi-get operations in one embodiment.

FIG. 3 illustrates the multi-set and multi-get operations in one embodiment. Instance 301 uses multi-set message 302 to populate values for a group of instance properties 303. The group of instance properties 303 may be defined by a property bag and/or individual instance properties (e.g. A-D) may be identified by multi-set message 302. The group of instance properties A-D may be populated atomically in one episode by instance 301—assuming instance 301 has values for all of the instance properties. If instance 301 does not yet have a value for one or more of the instance properties, then a value for that instance property is not populated.

Instance 304 may need to know certain instance properties of instance 301. Using multi-get message 305, instance 304 may read a group of instance properties all at the same time atomically, during a single episode. If all of the instance properties in the group are populated, multi-get message 305 will return those values. However, if one or more value (e.g. B) for the group of instance properties is not yet populated, the multi-get message 305 will wait until the missing value or values are populated and will then return the values for the group. If one of the values (e.g. A) becomes invalid while the multi-get operation is waiting for another value (e.g. B) to be populated, the multi-get operation will not return any of the values until the entire group of instance properties is populated and valid. An error may be returned if the values are not populated within a defined period.

Multi-get message 305 may be scoped at the instance property, property bag, or instance level. For example, instance properties A and B may be in one property bag (PB 1), while instance properties C and D may be in another property bag (PB 2). Multi-get message 305 may read multiple property bags, where each property bag is read separately.

In one embodiment, the system may avoid executing the program when instance property values are being read. If a value is requested, and it does not exist, then the system infrastructure may run the instance associated with the requested instance property in order to populate the value for the instance property. For example, a multi-get message may direct the instance to run and may then wait for the instance properties to be populated.

The multi-get request 305 is sent from instance 304 to instance 301. The result is a response message comprising values for the instance properties requested in the multi-get request 305 or error values for missing instance properties or both. The response appears to the requesting instance 304 to be coming from instance 301; however, the response is actually coming from the system infrastructure which is maintaining the instance property values.

The instance properties have a lifetime defined by an expiry parameter. An instance may populate a group of instance properties as the relevant data is observed—e.g. lazily populate the instance properties. Alternatively, the instance may populate all of the instance properties in response to the first read, request or demand for the instance property value. The instance property values remain populated during the defined lifetime of the instance property. When a request is received for a particular instance property value, the system either reports the existing value, if populated, or re-runs the instance if the value has expired or is unpopulated.

Figure 4:
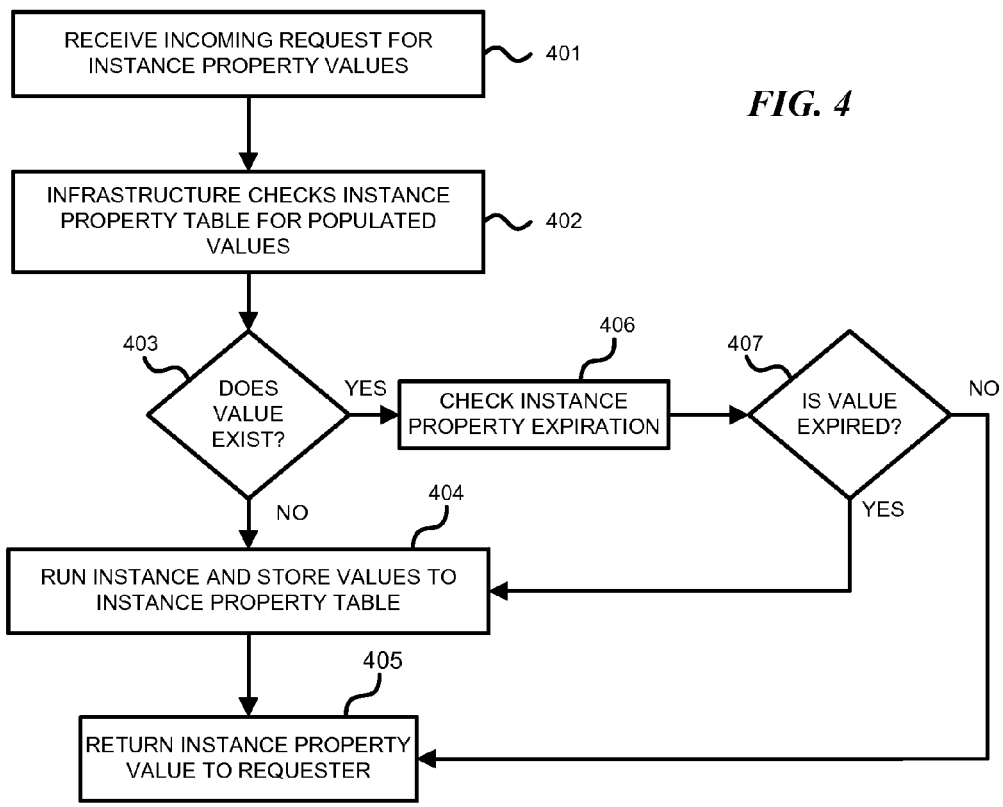
FIG. 4 is a flowchart illustrating a method for requesting instance properties and responding in requests according to one embodiment.

FIG. 4 is a flowchart illustrating a method for requesting instance properties and responding in requests according to one embodiment. The infrastructure system receives a request for instance property values in step 401. The infrastructure checks the instance property table to determine if the values are populated in step 402. Step 403 evaluates whether the requested values exist. If one or more of the requested values are not present, then the process moves to step 404 and the instance is run and the instance property values are stored to the table. The stored instance properties are then returned to the requesting instance in step 405.

If, in step 403, the requested values are present in the table, then the instance property expiration is checked in step 406. In step 407, the instance property expiration is evaluated. If the instance property has expired and, therefore, the data is not valid, then the process moves to step 404 and the instance is run again. The new data is stored to the instance property table in step 404. Then in step 405, the new stored instance properties are then returned to the requesting instance.

If, in step 407, the instance property has not expired, then the data is valid. The process moves to step 405 and the stored instance properties are returned to the requesting instance.

It will be understood that the instance may refuse to run or the infrastructure may decline to run the instance in step 404. In such a case, an error message may be returned to the requesting instance to indicate that the instance property value is not available.

In one embodiment, the configuration and context system uses the state of instances to represent data for configuration or context, and messages to retrieve and update this data. This forms the foundation for the scalability and consistency of the system, which is achieved by:

eliminating the contention that would be caused by using course-grained configuration files for storing configuration and context data for many program instances in one file, especially considering the large number of changes in configuration and context data that may be needed for many millions of program instances;

eliminating scalability bottlenecks caused by maintaining many millions of configuration files, for example, if each program instance had its own configuration file for its configuration and context data, or by having many millions active database connections, for example, if each program instance was retrieving its context and configuration data from databases;

normalizing the configuration and context data, so that data shared between program instances may be maintained at a program definition scope, and data shared between program definitions can be maintained at a higher scope; and leveraging episodic execution of instances, which is triggered by a message to assure that data is changed in a consistent way.

Instance properties do not require execution of an episode of the instance to retrieve data owned by the instance. The need to run the instance can be avoided by system support of the instance properties. The instance properties are an addition to the set of supported low-level IO (input-output) patterns supported by the system. These instance properties provide a way for instances to expose data values without requiring the instance to implement a dispatch loop for read requests.

An instance is the "owner" of the configuration and context data, and it publishes that data as a collection of instance properties that may be added to the next checkpoint. When publishing instance properties, the instance may optionally group them into property bags.

When a client, such as another instance, wants to retrieve a value of one of these instance properties, it may send an appropriate message to the hosting infrastructure based on the fully qualified name of the instance property. The hosting infrastructure processes this message and returns the requested value of the instance property, without executing any episode on the instance.

The instance may update the values of its instance properties by emitting a new value as part of a subsequent checkpoint, such as when configuration or context data has changed.

If an instance issues a read for a property, followed by an operation that updates the property, and followed by a second read, then the second read is guaranteed to get the updated property value, which was populated by the update operation.

The hosting infrastructure implements a mechanism—multi-get and multi-set—for a consistent retrieval and consistent updates of an arbitrary set of configuration data.

In one example, an instance A wants to publish a set of related instance properties, such as the coordinates of a destination D: latitude and longitude. Instance B may later need to retrieve the latitude and longitude values. Instance B may send a first message to retrieve the latitude value, and then send a second message to retrieve the longitude value. However, if the coordinates have changed between the time when the first message is processed and the time when the second message is processed, then instance B will retrieve the wrong coordinates consisting of a latitude for one location and a longitude of different location.

The present invention solves this type of problem using multi-get and multi-set. When a client (e.g., instance B) wants to retrieve a value of a set of instance properties, such as latitude and longitude, the client sends a message to the hosting infrastructure containing a list of fully qualified names specifying the instance properties for latitude and longitude as well as the address of the target instance.

The client instance creates an application entry point to be resumed by the system when the latitude and longitude results are available. This entry point is resumed when all of the associated data values have been retrieved. In this way instance B can retrieve a consistent set of coordinates.

The lifetime of the configuration and context data can be managed using the expiry property that manages the lifetime of the instance properties. When publishing instance properties, the owning instance can optionally specify a property value expiration time. When an expired property is requested, the hosting infrastructure notifies the instance that originally published this instance property. If the instance would rather not be notified when a missing/expired property is requested, it can specify a default value to be returned.

When the instance is notified, an episode is executed and the instance can retrieve, obtain or calculate the new value. The instance properties do not have to be set immediately within the episode. Instead, the instance may asynchronously publish the data. The request is satisfied once all the properties in the request are simultaneously available and valid.

Like all system communication, an instance property request may be responded to with either a value or an exception. As an example, an instance may expose a property bag with a fallback value containing an app-specified, property-not-found exception with no expiration. Then, all requests for expired or missing values would receive the exception, rather than provoking an episode on the instance.

The lifetime of instance properties is scoped to the instance lifetime. Instances can be used to represent program definitions and scopes. Features implemented with those instance properties inherit the instance's lifetime because they are implemented as instances. When the lifetime of a given scope, program definition, or program instance ends, the corresponding configuration and context data can be safely deleted by the hosting infrastructure.

On top of the instance properties, a higher level semantic of external variables may be implemented. External variables represent pieces of configuration and context data. External variables may be defined at various scopes, such as a tenant scope, user application scope, program definition scope and program instance scope. Within business logic, a consistent abstraction is provided to allow users to retrieve or set a value based on name and scope.

By modeling the configuration and context system in the way described above, the instance properties:
- achieve an ultra-high scale, while maintaining consistency requirements;
- optimize the retrieval of data owned by an instance, without starting up that instance and without executing an episode of the instance;
- provide a mechanism for describing the expiration time for each piece of configuration and context data;
- manage the lifetime of the configuration and context data;
- provide a mechanism for a consistent retrieval and consistent updates of an arbitrary set of configuration data; and
- provide automatic resolution of different levels of context including the instance level in a continuation-based runtime.

An instance manager may be responsible for executing the instances' processing logic and controlling the instances. The instance manager also manages the instances' lifetime. Control messages may be exchanged between instance manager and an instance processor to create new instances and to terminate existing ones. The instance manager is responsible for implementing these commands and, as a result, is aware of the lifetime of all instances.

The instance manager may be responsible for handling message exchange between instances. The instance manager is provided with additional knowledge about each message, including which instance sent the message and instance (or instances) should receive the message. The instance manager offers a restricted set of messaging patterns, which allows the system to make concrete statements about the behavior of messaging within the system to simplify the system and its administration. Two primary messaging patterns are Request-reply and One-Way, which are described in pending U.S. patent application Ser. No. 13/118,095, titled "Managing and Simplifying Distributed Applications," filed May 27, 2011, the disclosure of which is hereby incorporated herein in its entirety.

Figure 5:
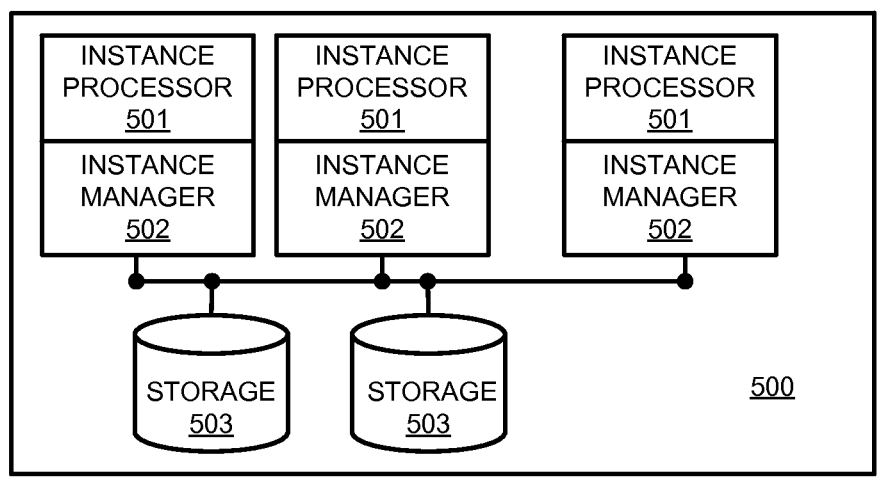
FIG. 5 is a high-level block diagram of the topology of a distributed instances system according to one embodiment.

FIG. 5 is a high-level block diagram of the topology of a distributed instances system 500 according to one embodiment. The instance processors 501 may be implemented as a number of instance processing nodes 501 each under the control of an instance manager 502. An instance storage 503 that holds instances during periods of inactivity as well as application states and message states. The instance processor provides reliable messaging and recoverability in the event of a system failure. However, either of these capabilities may be sacrificed if, for example, neither reliable messaging nor durable instances are required or desired.

The instance manager 502 is responsible for loading the instances' processing logic to the assigned instance processor 501. This allows the system to present a number of additional simplifying benefits to applications, including the capability to load different versions of processing logic and allowing the side-by-side execution of instance versions. For example, a business process that starts with version 1 of an instance's processing logic may continue to use that version, even when version 2 is created. New instances of the business process may automatically leverage the latest version.

Furthermore, the system's capability to represent a business process as a hierarchy of distinct yet coordinated instances significantly reduces the impact of changes to ongoing processes, thereby allowing application developers to model processes as a composition of independently versionable instances.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

For example, in FIG. 5 storage 502 may be any volatile or non-volatile storage device, such as a hard drive, flash memory, solid state memory, optical disk, CD, DVD, computer program product, or other memory device, that provides computer-readable or machine-readable storage for instance processors 501. In other embodiments, the memory may be a virtualization of several physical storage devices, wherein the physical storage devices are of the same or different kinds. The code segments may be downloaded or transferred from storage 503 to instance processors 501 via an internal bus, another computer network, such as the Internet or an intranet, or via other wired or wireless networks, etc.

The system 500 may include a variety of computer-readable media. Computer-readable media may be any available media that can be accessed by a computer or processor and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the system 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
in a computer having a processor and a memory, wherein the memory has program instructions stored thereon that, upon execution by the processor, cause the computer to execute a instance manager configured to manage a plurality of instances of a single application, and wherein each of the plurality of instances is remotely located with respect to the other instances;
storing, by the instance manager, a table having a plurality of entries, each entry having at least one instance property and value pair corresponding to each of the plurality of instances, each of the instance properties and value pairs having been published to the table by a corresponding one of the plurality of instances during a most-recent execution of the corresponding instance;
updating the table, by the instance manager, with an updated instance property and value pair published by a first one of the plurality of instances in response to execution of the first instance;
receiving, at the instance manager, from a second one of the plurality of instances while the first instance is not being executed, a request that identifies the updated instance property; and
in response to the request, providing, by the instance manager, an updated value stored in the table as corresponding to the updated instance property to the second instance while the first instance is not being executed and without using any configuration files external to the first instance, wherein the response appears to the second instance as if it were being provided directly by the first instance and not by the instance manager;
wherein each instance property further comprises an expiration that defines a lifetime of the instance property, and wherein the values of the one or more instance properties are available to other instances during the instance property lifetime.

2. The method of claim 1, further comprising:
deleting an instance property following expiration of the lifetime of the instance property.

3. The method of claim 1, further comprising:
overwriting a value of a selected instance property during a subsequent episode of the first instance.

4. The method of claim 1, further comprising:
associating a default value with an instance property; and
returning the default value when an instance property is requested after it has expired.

5. The method of claim 1, wherein two or more instance properties are grouped into a property bag.

6. The method of claim 5, further comprising:
sending a multi-set message from the instance to populate multiple values for the instance properties within a selected property bag.

7. The method of claim 1, further comprising:
receiving a multi-get request for values corresponding to properties published by two or more of the plurality of instances;
determining that at least one of the requested values has not been populated by a corresponding instance;
waiting until all of the requested values have been populated; and
providing a response to the multi-get request containing all of the requested values in response to all of the requested values having been populated.

8. A distributed instance system, comprising:
one or more processors configured to run a plurality of instances of a single application; and
a storage device coupled to the one or more processors, the storage device having program instructions stored thereon that, upon execution by the one or more processors, cause the distributed instance system to provide an instance manager configured to manage the plurality of instances, the instance manager further configured to:
store a table having a plurality of entries, each entry having at least one instance property and value pair corresponding to each of the plurality of instances, each of the instance properties and value pairs having been published to the instance manager by a corresponding one of the plurality of instances during a most-recent execution of the corresponding instance;
update the table, by the instance manager, with an updated instance property and value pair published by a first one of the plurality of instances in response to execution of the first instance;
receive, from a second one of the plurality of instances, a request that identifies one of the plurality of instance properties published by the first instance while the first instance is not being executed; and
in response to the request, provide a value stored in the table as corresponding to the identified one of the plurality of instance properties to the second instance while the first instance is not being executed and without using any configuration files external to the first instance, wherein the response appears to the second instance as if it were being provided directly by the first instance and not by the instance manager;
wherein each instance property further comprising an expiration that defines a lifetime of the instance property, and the values of the one or more instance properties remaining available to other instances during the instance property lifetime.

9. The system of claim 8, wherein the logical construct deletes an instance property following expiration of the lifetime of the instance property.

10. The system of claim 8, wherein the first instance overwrites a value of a selected instance property during a subsequent episode.

11. The system of claim 8, wherein the first instance creates a new instance property during an episode of the instance.

12. The system of claim 8, wherein two or more instance properties are grouped into a property bag in the logical construct.

13. The system of claim 12, wherein the first instance sends a multi-set message to logical construct to populate multiple values in the instance properties within a selected property bag.

14. The system of claim 8, wherein the instance manager is further configured to:
receive a multi-get request for values corresponding to properties published by two or more of the plurality of instances;
determine that at least one of the requested values has not yet been populated by a corresponding instance;
wait until all of the requested values have been populated; and
provide a response to the multi-get request containing all of the requested values in response to all of the requested values having been populated.

15. A memory having program instructions stored thereon that, upon execution by a processor of a computer system, comprises:
causing the computer system to run an instance manager configured to manage a plurality of instances of a single application, wherein each of the plurality of instances is remotely executable with respect to the other instances, the instance manager further configured to:
store a table having a plurality of entries, each entry having at least one instance property and value pair corresponding to each of the plurality of instances, each of the instance properties and value pairs having been published to the instance manager by a corresponding one of the plurality of instances during a most-recent execution of the corresponding instance;
update the table, by the instance manager, with an updated instance property and value pair published by a first one of the plurality of instances in response to execution of the first instance;
receive, from a given one of the plurality of instances, a multi-get request that identifies one of the plurality of instance properties published by two or more of the plurality of instances while the two or more of the plurality of instances are not being executed; and
in response to the multi-get request:
determine that at least one of the values associated with the requested one of the plurality of instance properties has not yet been populated by a respective one of the two or more instances;
wait until all of the values associated with the requested one of the plurality of instance properties have been populated by their respective instances; and
send, to the given instance, a response to the multi-get request containing all of the values associated with the requested one of the plurality of instance properties, wherein the response appears to the given instance as if it were being provided directly by the two or more instances and not by the instance manager;
wherein each instance property further comprising an expiration that defines a lifetime of the instance property, and the values of the one or more instance properties remaining available to other instances during the instance property lifetime.

* * * * *